United States Patent [19]

Van Saarloos

[11] Patent Number: 5,331,466
[45] Date of Patent: Jul. 19, 1994

[54] METHOD AND APPARATUS FOR HOMOGENIZING A COLLIMATED LIGHT BEAM

[75] Inventor: Paul P. Van Saarloos, Innaloo, Australia

[73] Assignee: Lions Eye Institute of Western Australia Inc., Nedlands, Australia

[21] Appl. No.: 690,104

[22] Filed: Apr. 23, 1991

[51] Int. Cl.$^5$ ............................................. G02B 3/00
[52] U.S. Cl. .................................. 359/723; 359/710; 359/722
[58] Field of Search ............... 359/710, 722, 723, 740, 359/891, 710, 894, 900; 351/221

[56] References Cited

U.S. PATENT DOCUMENTS

| 3,821,794 | 6/1974 | Yoneyama | 359/891 |
| 4,783,133 | 11/1988 | Chen | 359/900 |
| 5,059,013 | 11/1991 | Jain | 359/894 |
| 5,080,474 | 1/1992 | Miyamoto | 359/710 |
| 5,090,798 | 2/1992 | Kohayakawa | 351/221 |

OTHER PUBLICATIONS

Optical System for Laser Machine of Narrow Slots, M. A. Grimm vol. 14 No. 19 Feb. 1972 IBM.

Primary Examiner—William L. Sikes
Assistant Examiner—Hung Xuan Dang
Attorney, Agent, or Firm—Harness, Dickey & Pierce

[57] ABSTRACT

A method and apparatus for smoothing and homogenising the cross-sectional intensity distribution of the output from an excimer laser for improved application of excimer lasers to optical laser surgery to the cornea. The laser beam is focused by means of a cylindrical lens or mirror and then filtered using a narrow gap spatial filter to smooth the intensity distribution by removing high spatial frequencies. The resulting output beam may be collimated by means of a second cylindrical lens or mirror for application to further optical processes.

33 Claims, 8 Drawing Sheets

METHOD AND APPARATUS FOR HOMOGENIZING A COLLIMATED LIGHT BEAM

BACKGROUND OF THE INVENTION

1. Field of the Invention

The present invention relates to a method and apparatus for homogenising an intensity profile of a collimated light source. In particular, the method and apparatus of the present invention is useful for smoothing and homogenising a non-uniform intensity profile of an excimer laser.

2. Description of the Prior Art

Excimer lasers currently find use in a wide range of applications which involve etching and shaping by ablation of many types of material. For example, excimer lasers are useful in such applications as semiconductor annealing, microphotolithography, photodeposition, as well as optical laser surgery of the cornea involving area ablations. The advantages of using excimer laser radiation include the precision with which the etching or shaping can be done, and the smoothness and lack of damage to newly exposed material surface. However, this precision and smoothness is limited by the smoothness of the energy or intensity profile of the laser beam. A smooth and even energy distribution is most important for predicting the result of optical surgery, and for the cornea to heal without any scarring. Further, any excimer laser application involving coated optics or mirrors may be compromised by a non-uniform intensity profile since high energy spots in the laser beam can be close to the damage threshold of these coatings and could quickly degrade the coating.

The characteristics of an excimer laser are such that the near field intensity distribution in one cross-sectional dimension is typically quasi-Gaussian in shape, whilst the intensity distribution of the beam in the orthogonal cross-sectional dimension is approximately uniform. Many applications require the intensity distribution to be uniform over the entire cross-sectional area of the beam. Prior art systems have attempted to accomplish this by using cylindrical lenses to expand the beam in the quasi-Gaussian dimension. However, this produces only an approximation to a uniform beam, which is not entirely satisfactory for many applications.

An excimer laser beam generally consists of a plurality of modes, each with its own particular energy distribution and divergence. Intracavity and beam expansion optics cause interference fringes to appear in the expanded beam, resulting in ripples in the intensity distribution, and areas of very high energy at the edges of the beam in the expanded dimension. Further, the output distribution is difficult to predict since, in an excimer laser, the proximity of the electrodes and the shape of the electric field between them have a larger effect on the mode structure than the optical cavity, in contrast to many other laser constructions.

Prior art methods of smoothing the output from excimer lasers have involved some form of optical integration, such as disclosed in U.S. Pat. No. 4,733,944. These optical integration techniques either involve splitting the input beam into small segments and overlapping the output from each segment, or some kind of randomisation of the laser output beam in either phase or amplitude. Such optical integration is generally aimed at time or space averaging of the fluctuations in beam intensity to produce a substantially uniform distribution. The major disadvantage with this technique is that, after smoothing, the laser beam has lost most of its laser like qualities, and in particular the divergence of the laser beam becomes quite large. This makes applying further optical processes to the smoothed beam very difficult. Further, although optical integration can produce a reasonably uniform intensity distribution, it is not usually very efficient at smoothing the beam, and points of high energy and other inhomogenities can still remain in the integrated output beam. It is also possible that the laser light from different segments in a beam splitting optical integrator could interfere with each other and create an interference ripple pattern in the intensity distribution. Another disadvantage occurs with the time average integration technique in that when only a few pulses of a pulsed excimer laser are required for ablation of the target, the radiation time is generally not sufficient to substantially smooth an inhomogeneous intensity distribution, and the smoothness and uniformity of the cut profile are still dependent on the smoothness and uniformity of the input laser beam.

BRIEF SUMMARY OF THE INVENTION

The present invention proposes a method and apparatus for homogenising a collimated input beam to overcome or significantly reduce some or all of the above mentioned difficulties associated with the prior art.

In accordance with the present invention there is provided a method for homogenising a collimated input light beam having a non-uniform cross sectional intensity distribution, comprising the steps of:

focusing the beam into a line; and filtering the beam by means of a spatial filter disposed adjacent the line so as to produce an output beam;

whereby the output beam is homogenised such that the output beam has a relatively uniform cross sectional intensity distribution.

Preferably said spatial filter comprises a longitudinal gap formed between the edges of a material having a high resistance to excimer laser ablation.

Preferably said input light beam is generated by an excimer laser.

In accordance with the present invention there is also provided apparatus for homogenising a collimated input light beam having a non-uniform cross-sectional intensity distribution, comprising:

focusing means for focusing the input beam into a line; and a spatial filter disposed adjacent the line for filtering the beam to produce an output beam;

whereby the output beam is homogenised such that the output beam has a relatively uniform cross-sectional intensity distribution.

Preferably said focusing means comprises a cylindrical lens.

In accordance with the present invention there is further provided a method for homogenising a collimated input light beam having a non-uniform cross-section intensity distribution defined by the function $U_1(x_1)$, where $x_1$ is a cross-sectional dimension of the input beam, comprising the steps of:

focusing the input beam to produce a transformed beam, the intensity distribution function $(U_2(\omega_x))$ of which is defined by the Fourier transform of $U_1(x_1)$, such that $$U_2(\omega_x) = \int U_1(x_1) \exp[-i\omega_x x_1] dx_1;$$

filtering the transformed beam by means of a spatial filter having an aperture defined by the aperture function $S(x_2)$, where $$S(x_2) = \{1 \text{ for } -b \leq x_2 \leq b$$
$$\{0 \text{ otherwise}$$

where $2b$ is the width of the aperture of said spatial filter and $x_2$ is a cross-sectional dimension of the transformed beam;

whereby to remove from the transformed beam spatial frequencies $\omega_x$ which are greater than a threshold $Kb$, where $K$ is a positive constant, and produce a filtered beam, the intensity distribution of which is defined by the function $U_s(\omega_x)$, where $$U_s(\omega_x) = \{U_2(\omega_x) \text{ for } |\omega_x| \leq Kb$$
$$\{0 \text{ otherwise,}$$

said filtered beam having substantially greater homogeneity of cross-sectional intensity distribution than said input beam.

BRIEF DESCRIPTION OF THE DRAWINGS

Preferred embodiments of the present invention will hereinafter be described, by way of example only, with reference to the accompanying drawings, wherein.

DETAILED DESCRIPTION

Figure 5:
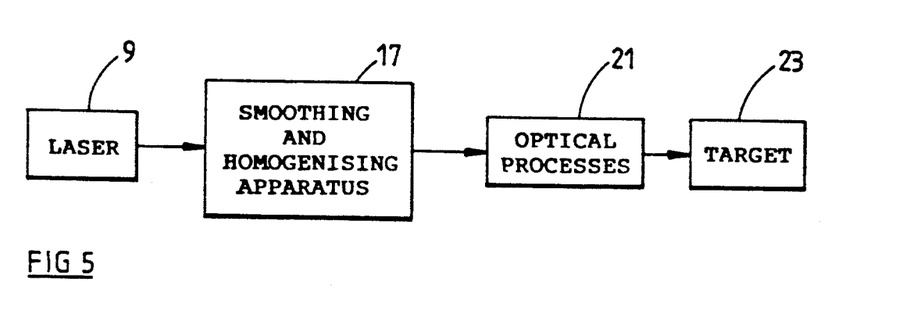
FIG. 5 shows a generalised arrangement of the apparatus of an embodiment of the present invention.

FIG. 5 shows a generalised arrangement in which apparatus in accordance with embodiments of the present invention may be utilised. Smoothing and homogenising apparatus 17 receives a coherent collimated light beam from laser light source 9. In the apparatus 17 the light beam is operated upon by the methods of the present invention to produce an output beam which may then be directed to further optical processes 21. The beam is finally directed to strike a target 23 to perform its prescribed function.

Figure 1:
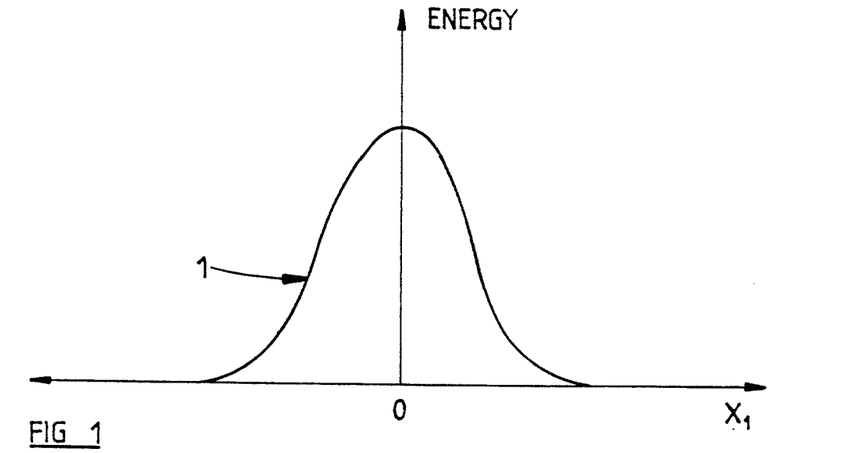
FIG. 1 shows an intensity distribution of an excimer laser beam in a cross-sectional direction $x_1$.

In the case of an excimer laser source, the near field intensity/energy distribution of the laser beam is typically quasi-Gaussian in one cross-sectional dimension "$x_1$", indicated as reference numeral 1 in FIG. 1. In the orthogonal cross-sectional dimension "$y_1$" the intensity/energy distribution is approximately uniform, and indicated by the reference numeral 3 in FIG. 2. However, intracavity and beam expansion optics acting on the plurality of modes within the beam cause interference fringes, ripples, peaks and troughs to appear in the intensity distribution in the quasi-Gaussian dimension $x_1$. This results in an intensity distribution as indicated by reference numeral 5 in FIG. 3, having peaks and troughs of high and low energy, and a generally non-smooth distribution.

Figure 2:
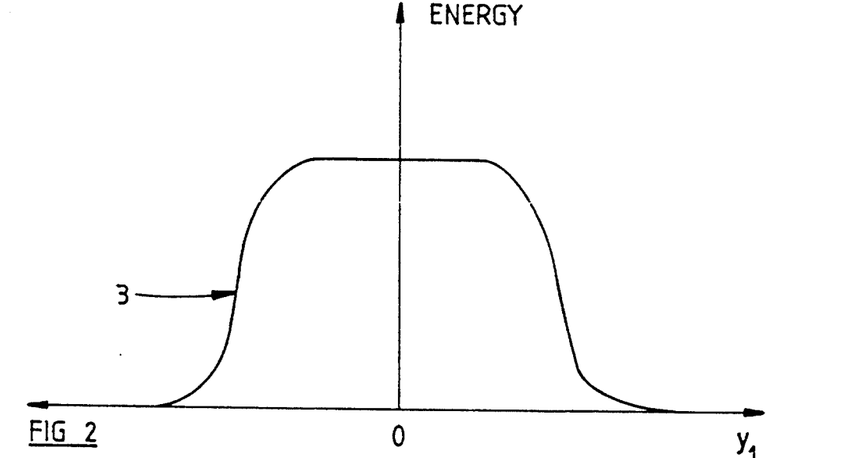
FIG. 2 shows an intensity distribution of an excimer laser beam in a cross-sectional direction $y_1$, orthogonal to direction $x_1$ of FIG. 1.
Figure 3:
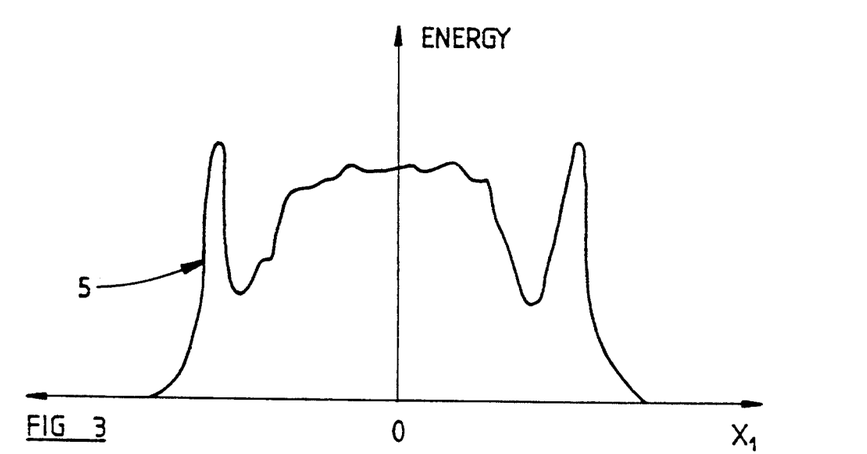
FIG. 3 shows an intensity distribution of an expanded excimer laser beam in a direction corresponding to $x_1$ of FIG. 1.
Figure 6:
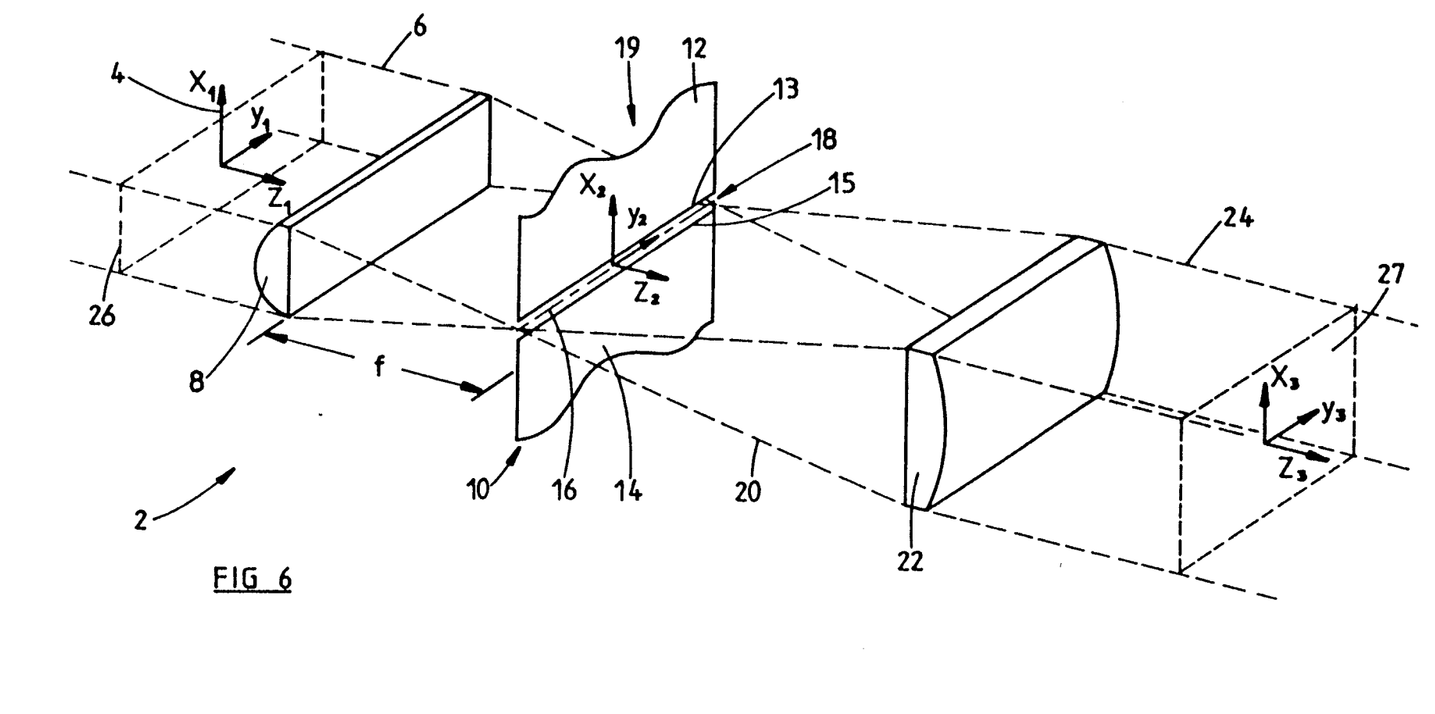
FIG. 6 shows a first embodiment of the present invention.

FIG. 6 shows smoothing and homogenising apparatus 2 arranged in accordance with a first embodiment of the present invention. Collimated coherent light is received from the laser source 9, for example, an excimer laser, and follows an initial input beam path 6, as indicated by dashed lines, to a cylindrical focusing lens 8. At input reference plane 26, reference coordinate axes 4 correspond to the axes of FIGS. 2 and 3. For example, the input beam at the cross-sectional input reference plane 26 would typically have an intensity distribution in the dimension indicated by $y_1$ which is substantially constant over the cross-section of the beam, such as shown in FIG. 2. Across the dimension indicated by $x_1$, the input beam may have an intensity distribution such as indicated by reference numeral 5 in FIG. 3. The dimension referred to as $z_1$, indicates the direction of travel of the input beam.

Cylindrical focusing lens 8 is placed in the input beam path 6, with a convex face oriented towards the source of the input beam and a plane face oriented in the direction of travel of the beam. The axis of the cylindrical focusing lens 8 is aligned so as to be substantially parallel to reference coordinate axis $y_1$. Cylindrical focusing lens 8 acts to alter the path of the beam from the input beam path 6 to an intermediate beam path 20, such that the beam is focused in the $x_1$ dimension at focus line 16. The focus line 16 is located at a distance $f_8$ from the focusing lens 8 corresponding to the focal length of the lens, in a direction corresponding to the direction of the beam. A spatial filter 10 is disposed in the plane of the focus line 16, and comprises coplanar upper and lower filter plates 12, 14. The upper and lower filter plates 12, 14 have upper and lower opposing parallel edges 13, 15, located adjacent the focus line 16, defining a longitudinal filter gap 18. The beam from cylindrical focusing lens 8 converges at focus line 16, and passes through filter gap 18, following intermediate beam path 20 until the beam reaches cylindrical lens 22. The cylindrical lens 22 is oriented in the intermediate beam path 20 with its axis parallel to reference coordinate axis $y_1$, and has a planar face directed towards the spatial filter 10 and a convex face directed away from the spatial filter. After passing through spatial filter 10, the beam following intermediate beam path 20 passes through cylindrical lens 22 which alters the beam path to output beam path 24. To obtain an output beam which is collimated the focal plane of the lens 22 must be coincident with plane 19 containing the focus line 16 of the beam 20. It is not essential that the beam be recollimated following filtering. However, if further optical processes are to be employed after homogenisation and smoothing of the beam, a collimated output beam is advantageous.

Figure 7:
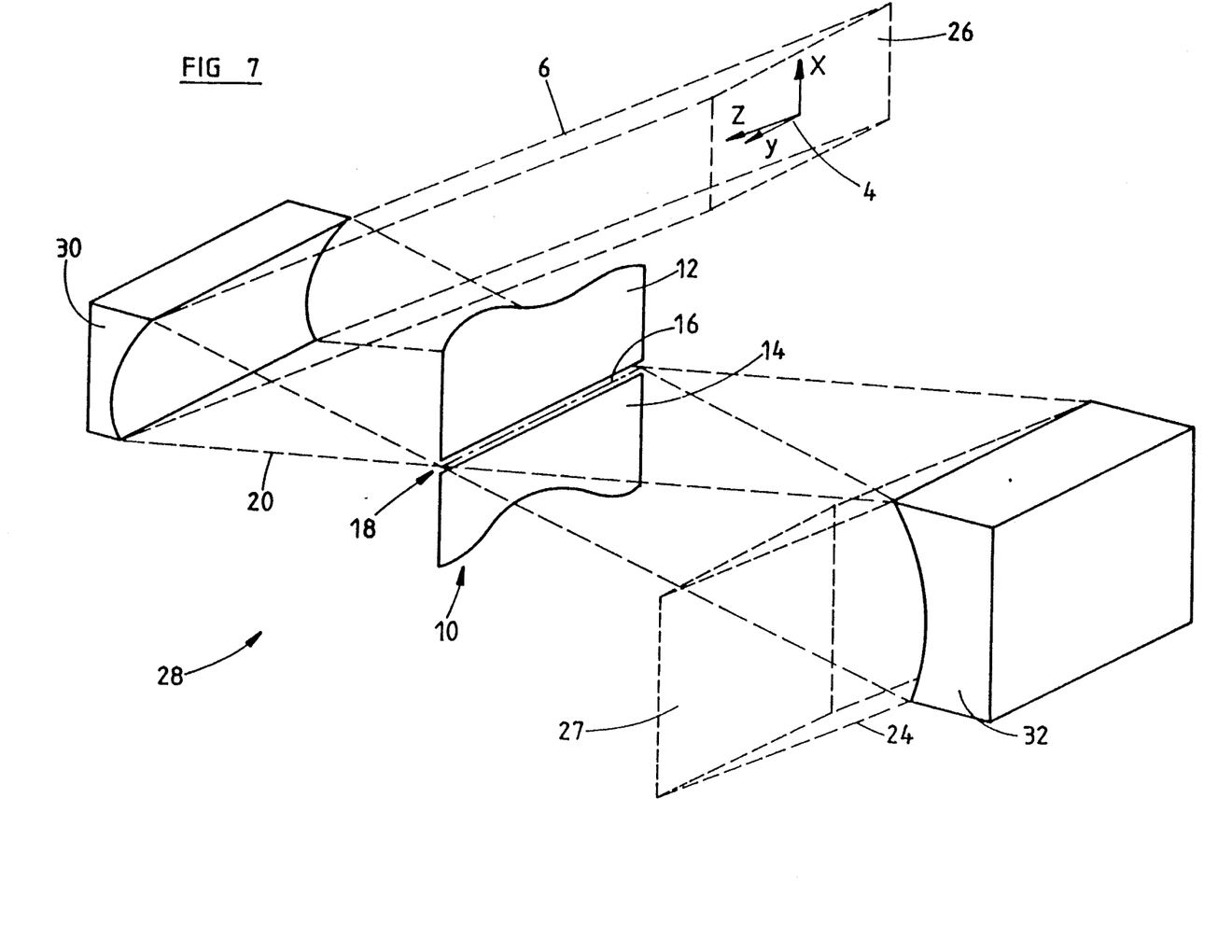
FIG. 7 shows a second embodiment of the present invention.

FIG. 7, in which reference numerals in common with FIG. 6 denote similar items, shows a perspective view of a second smoothing and homogenising apparatus 28, wherein the cylindrical focusing lens 8 and the cylindrical lens 22 of the embodiment illustrated in FIG. 6 are replaced by a cylindrical focusing mirror 30 and a cylindrical mirror 32, respectively. In the arrangement of apparatus 28, the input beam path 6 and the output beam path 24 are not collinear as in the apparatus 2. Concave cylindrical focusing mirror 30 is disposed in the path of input beam 6 such that it reflects and focuses the beam to form intermediate beam path 20 at an acute angle to input beam 6. The axis of cylindrical focusing lens 30 is arranged parallel to axis $y_1$ and lies in the direction $z_1$ from the beam source 9. As in apparatus 2 hereinbefore described, a spatial filter 10 is constructed with a longitudinal filter gap 18 disposed adjacent the line of focus 16 of the cylindrical focusing minor 30. The spatial filter 10 is thus a distance from focusing minor 30 corresponding to the focal length of the minor 30. A second mirror, concave cylindrical minor 32, is arranged on the opposite side of spatial filter 10 from focusing mirror 30, at a distance from the filter 10 corresponding to the focal length of the mirror 32. The intermediate beam 20 reflects from mirror 32 to form collimated output beam 24 at an acute angle to intermediate beam 20.

In use, the collimated input beam 6 travels in the direction of axis $z_1$, orthogonal to axes $x_1$ and $y_1$. The input beam 6 reflects from concave cylindrical focusing mirror 30, to form intermediate beam 20 which converges at focus line 16, whereupon the intermediate beam 20 passes through the longitudinal gap 18 of spatial filter 10. The intermediate beam 20 thereafter reflects from concave cylindrical mirror 32 which re-collimates beam 20 to form collimated output beam 24. The overall path of the beam is in the form of a "Z" shape, with the mirrors 30, 32 at the vertices of the path.

The selection of lenses and mirrors for use in the apparatus 2 or 28 is primarily a matter choice of characteristics to suit the input and output beam constraints. For example, a typical excimer laser may produce a beam in the ultraviolet spectrum which is 25 mm in width (for example, in $y_1$ dimension) and 12 mm in height ($x_1$ dimension). In such a case, for ultraviolet input light, special materials for lens construction will be required to produce lenses which do not significantly attenuate the laser light during transmission. Materials which may be used for this purpose included fused silica, quartz, and magnesium or calcium fluoride. The choice of focal lengths of the lenses and mirrors will normally be governed by physical constraints of the system like overall path-length of light through the apparatus, and dimensional requirements for the output beam. If, for example, an approximately square output beam was required from the above mentioned excimer laser input beam, a magnification factor of x2 would be required in the $x_1$ dimension, and the focal lengths of the lenses would have to be chosen accordingly, so that:

$$\frac{f_{22}}{f_8} = 2$$

where
$f_{22}$ = focal length of lens 22
and
$f_8$ = focal length of lens 8

The combined focal lengths of the lenses also affects the physical size of the overall apparatus, and thus would ideally be kept as short as possible to reduce the space required by the apparatus. However, if the focal length of lens 8 is very short, adverse effects may arise from the thickness of the material from which the filter 10 is constructed. In practical terms, the focal length of lens 8 may be related to the width of the filter gap 18 and the thickness of the spatial filter material by:

$$f_8 > \frac{t \cdot h}{2w}$$

where
$t$ = filter material thickness
$w$ = filter gap width
$h$ = input beam height in $x_1$ dimension
and
$f_8$ = focal length of lens 8

Similar constraints and formulae may be applied in the case of mirrors rather than lenses.

Figure 8:
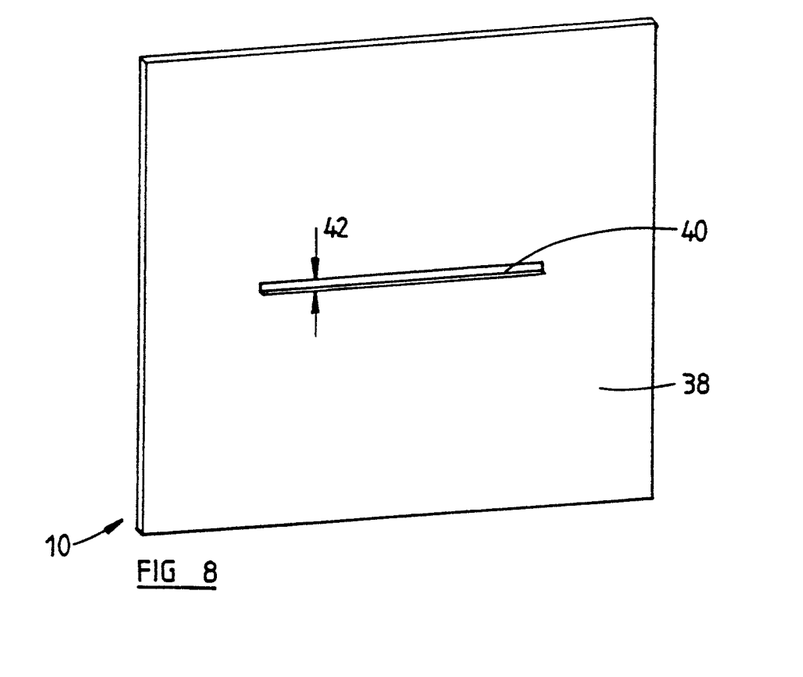
FIG. 8 shows the construction of a spatial filter.

FIG. 8 shows an example of a spatial filter 10 for use in the smoothing and homogenising apparatus 2 or 28 illustrated in FIGS. 6 and 7. The filter 10 comprises a filter plate 38 which is constructed from a sheet material such as stainless steel. The filter plate 38 is substantially rectangular and is provided with a longitudinal filter gap 40, approximately across the centre of the plate, having edges substantially parallel to the edges of the plate. In this case, the upper and lower filter plates 12, 14 of the arrangements illustrated in FIGS. 6 and 7 can be regarded as being integrally formed.

Figure 9:
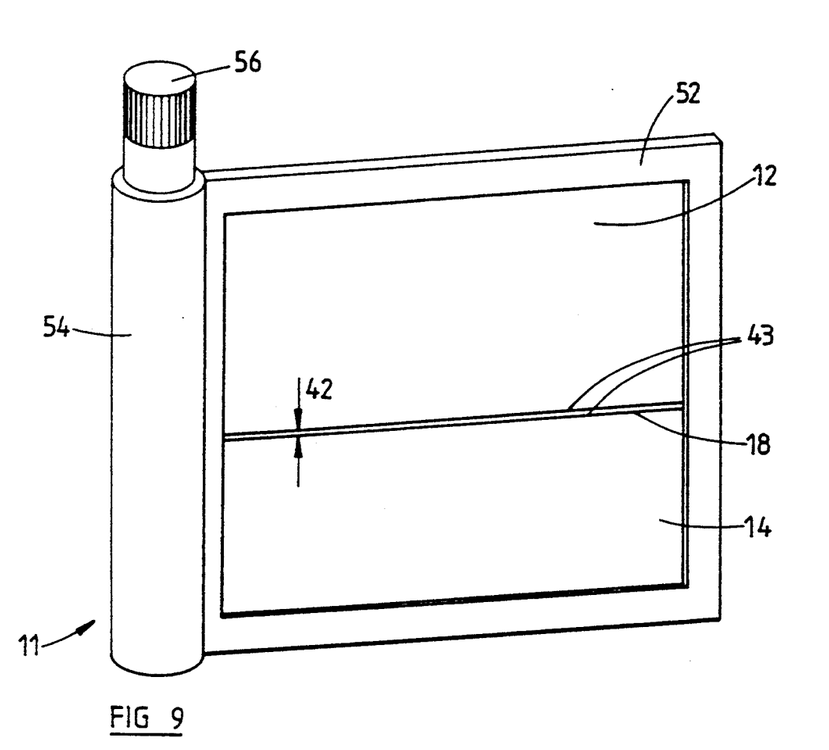
FIG. 9 shows an alternative spatial filter.

An alternative adjustable spatial filter 11 is shown in FIG. 9, having separately formed upper and lower filter plates 12, 14. The two plates 12, 14 are coplanar and slidably mounted in a frame 52. The opposing edges of the upper and lower plates 12, 14 are parallel, and define filter gap 18. One edge of frame 52 supports a cylindrical filter plate adjustment housing 54 and adjustment knob 56.

The gap width 42 of the filter gap 18 may be altered in the adjustable spatial filter 11 by rotating the adjustment knob 56. A threaded shaft is rotatably mounted coaxially within the filter plate adjustment housing 54, with the threaded portion engaging with saw-tooth formations along one edge of the upper or lower filter plates 12, 14. Adjustment knob 56 is rotatably coupled to the threaded shaft by means of rationed gears (not shown) which enables several rotations of knob 56 to effect small movements of one of the upper or lower plates 12, 14 relative to the other.

In order to allow the spatial filter 10 to withstand high energy radiation, such as from high energy excimer laser pulses, the filter plates 38, 12, 14 are preferably constructed from a sheet material which has a high resistance to excimer laser ablation. A suitable material is stainless steel, which has a high resistance to laser ablation, and may be machined or otherwise formed with a narrow gap 40 or straight smooth edges 43 necessary to form a spatial filter. The thickness of the sheet material should be such that it is thin enough to form a good optical slit where effects due to the material thickness are negligible, and thick enough so that the slit edges are not easily ablated by the laser light. Further, a spatial filter 10 of the form shown in FIG. 8 may be easily and cheaply constructed, in a variety of gap widths, so as to be easily replaceable when a filter in use eventually becomes damaged by high energy radiation.

Figure 11:
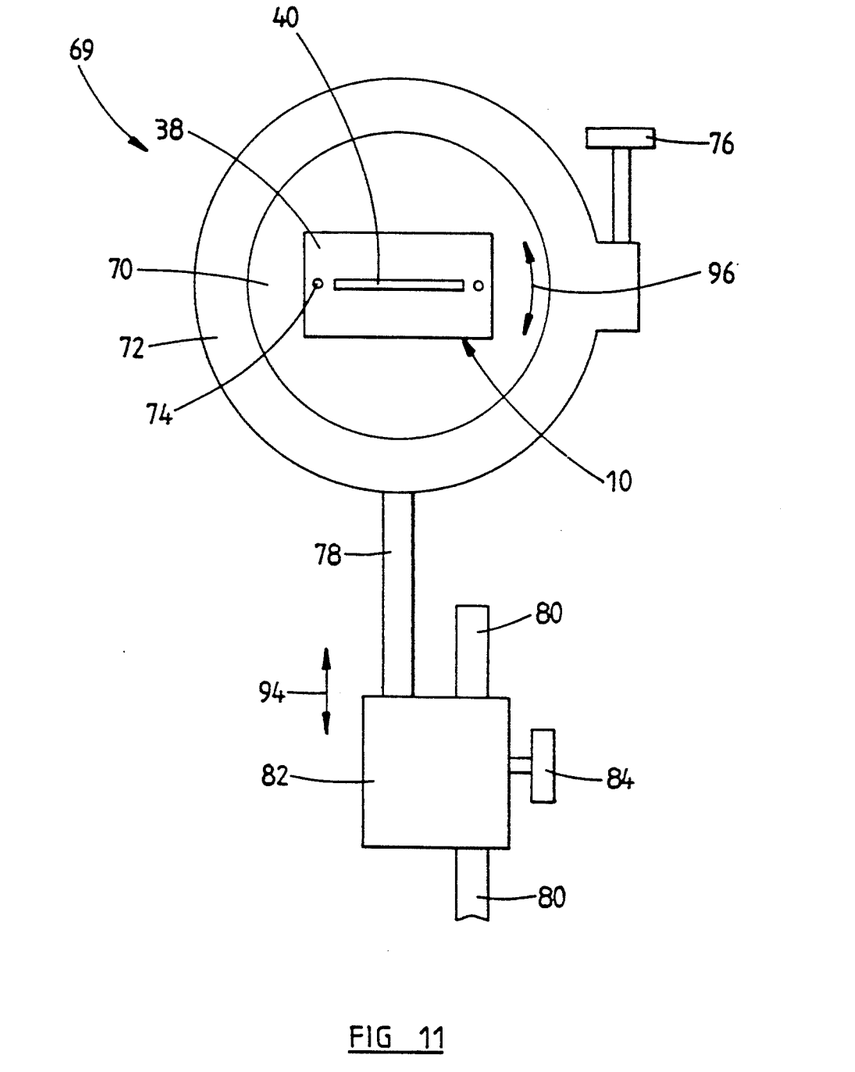
FIGS. 11 and 12 show mounting means for mounting a spatial filter.

In practice, some form of holding means is necessary to hold the spatial filter 10 in the plane adjacent the focus line 16 (see FIGS. 6 and 7). FIG. 11 shows a means 69 which is suitable for this purpose. The mounting means 69 is secured in a fixed position relative to the $y_2$ and $z_2$ axis (see FIG. 6) by means of a generally vertical fixed lower shaft 80. A vertical movement means 82 engages a portion of the lower shaft 80 such that rotation of a vertical movement adjustment knob 84 enables the vertical movement means 82 to move in either direction along the length of the lower shaft 80, as indicated by arrows 94. A generally vertical upper shaft 78 connects the vertical movement means 82 to an annular plate frame 72. The annular plate frame 72 is held in position by the upper shaft 78 whereby the axis of the annular plate frame 72 is substantially parallel to coordinate axis $z_2$ (FIG. 6). Within the annular plate frame 72 is contained a circular aperture plate 70 having a rectangular aperture 90 in its centre. The edge of aperture plate 70 is contained within the annular portion of annular plate frame 72 and engages rotation movement means within frame 72 such that rotation of a rotation adjustment knob 76 which extends from the frame 72 causes the rotation movement means to rotate the aperture plate 70 about its axis in either of the rotation directions indicated by arrow 96. The spatial filter 10 is affixed to the centre of the aperture plate 70 so that the filter plate 38 extends over aperture 90. In use, the light which is incident upon gap 40 in filter plate 38 passes through both the filter gap 40 and the aperture 90 in aperture plate 70. In the mounting means 69 shown in FIG. 11 the filter plate 38 is affixed to the aperture plate 70 by means of two mounting screws 74 located adjacent opposed ends of the filter gap 40.

By utilising a spatial filter 10 in conjunction with mounting means 69 a twofold advantage is effected. Firstly, mounting means 69 shown in FIG. 11 allows two degrees of freedom in movement of the filter gap 40 of the spatial filter 10 when mounted on the aperture plate 70. Vertical movement means 82 enables the vertical position (for example, along the direction indicated by coordinate axis $x_2$ in FIG. 6) of the filter gap 40 to be easily adjusted. Similarly, the angle of the filter gap 40 relative to the $x_2$ and $y_2$ axis may be readily adjusted by means of the rotation movement means controlled by the rotation adjustment knob 76. These two degrees of freedom, in use, allow the filter gap 40 to be easily and accurately aligned adjacent focus line 16 to enable maximum transmission of the focused beam through the filter gap 40, thus allowing efficient filtering of the input beam. Secondly, the spatial filter 10 is easily removable from the aperture plate 70, by removing mounting screws 74, which allows quick and easy replacement of the spatial filter 10. Even if the spatial filter 10 is constructed from a material having a higher resistance to excimer laser ablation, since the filter plate 38 is relatively thin, damage is likely to eventually occur to the filter plate 38 in the region of the filter gap 40 after extended use. Thus, having an arrangement whereby the spatial filter 10 is easily replaceable provides significant advantages.

Figure 12:
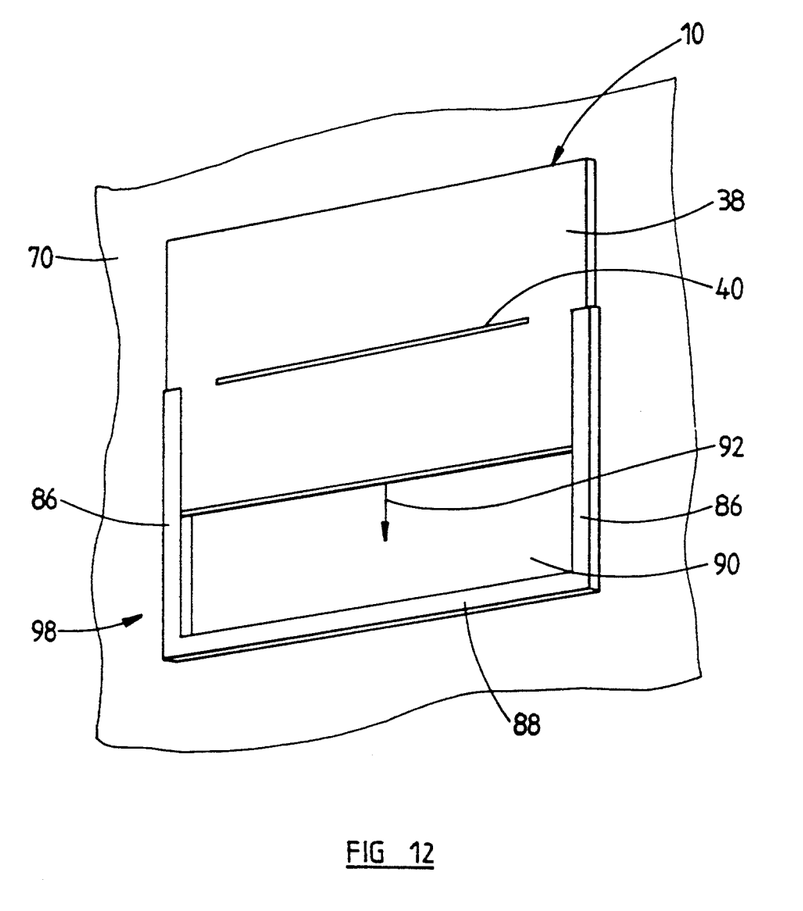

FIG. 12 is a perspective view of an alternative means whereby a spatial filter 10 may be mounted on the aperture plate 70 of a mounting means 69. In this arrangement, a holding frame 98 is provided on the aperture plate 70 along three sides of the rectangular aperture 90. The holding frame 98 comprises guide rails 86 provided along opposed sides of the aperture 90, and support rail 88 provided along the bottom edge of the aperture 90, said guide rails 86 and support rail 88 being constructed from channel shaped material having a generally U-shaped cross section. The filter plate 38 is of such dimensions that opposed edges of the plate 38 are able to engage the opposed grooves formed by the opposed inwardly facing channel shaped guide rails 86. FIG. 12 shows the filter plate 38 in an intermediate position whereby the edges of the plate 38 are engaged in the grooves formed by the guide rails 86, such that further movement of the filter plate 38 in the direction indicated by arrow 92 would cause the filter plate 38 to be guided along the guide rails 86 to a final position wherein the lower edge of the filter plate 38 is engaged by and supported by the upwardly facing channel shaped portion of support rail 88. A holding arrangement such as this allows sliding removal and replacement of the spatial filter 10, for example, in the event that the filter plate 38 becomes damaged.

In considering the construction of the spatial filter for use in embodiments of the present invention, the length of the filter gap in the $y_1$ dimension is generally unimportant as long as the gap is longer than the width of the input beam in the $y_1$ dimension. The width of the gap in the $x_1$ dimension, however, determines the degree of filtering of the beam, and also effects the energy loss of the beam in filtering and the ease with which the filter may be aligned with the beam focus line 16. For some applications the choice of a suitable width 42 for the filter gap 18 may be related to the focal length of the lens 8, the wavelength of the input light beam and the height of the beam in the $x_1$ dimension by:

$$w \alpha \frac{f_8 \lambda}{h}$$

where $f_8$ = focal length of lens 8
$\lambda$ = wavelength of input light beam
$h$ = input beam height in $x_1$ dimension and $w$ = filter gap width The above relationship, however, is ordinarily only applicable to predictions of a suitable gap width for an input beam which is essentially a single Gaussian mode. In practice, with an excimer laser having a beam intensity distribution produced by a mixture of a plurality of modes, a gap width which is substantially larger than that predicted by the above relationship should be used.

The smoothing and homogenising action of the embodiments of the present invention operates on the basis of spatial filtering (see, for example, Principles of Lasers by Orazio Svelto, 1976 Plenum Press New York).

Consider an image $U_1$, formed at input reference plane 26 of FIG. 5. If this image is formed from the collimated light of an excimer laser, the intensity distributions in the $x_1$ and $y_1$ directions would appear similar to those of 3 and 5 of FIGS. 2 and 3. The intensity distribution along the $y_1$ axis is approximately constant, thus the image $U_1$ in the $x_1$-$y_1$ plane may be approximated with good accuracy to a function of the distance $x_1$ from the origin only ($U_1(x_1)$). It can be shown that, by virtue of the Fresnel-Kirchoff diffraction integral, an image $U_2$ formed at the plane containing the focus line 16 will be equivalent to the Fourier transform of the image $U_1(x_1)$:

$$U_2(x_2) = F\{U_1(x_1)\}$$

and hence $$U_2(\omega_x) = \int U_1(x) \exp[-i\omega_x x] dx$$

where $$\omega_x = \frac{2\pi x_2}{\lambda f}$$

$f$ = focal length of lens 8
$\lambda$ = wavelength of collimated source

Similarly, momentarily neglecting spatial filter 10, an image $U_3$ formed at output reference plane 27, will be equivalent to the inverse Fourier transform of the image $U_2(\omega_x)$, wherein:

$$U_3(x_3) = F^{-1}\{U_2(\omega_x)\} = U_1(-x_1)$$

therefore $$U_3(x_3) = \left(\frac{\lambda f}{2\pi}\right)^2 \int U_2(\omega_x)\exp[-i\omega_x x_3]d\omega_x$$

Now, consider the spatial filter 10 as having an aperture defined by an aperture function such as:

$$S(x_2) = \{1 \text{ for } -a_2 \leq x_2 \leq a_2$$
$$\{0 \text{ otherwise}$$

for a longitudinal slit of infinite extent and width $2a_2$. If such a filter is present at the focal plane 19, the above equations yield:

$$U_3(x_3) = \left(\frac{\lambda f}{2\pi}\right)^2 \int U_2(\omega_x)\exp[-i\omega_x x_3]d\omega_x$$

where $$U_S(\omega_x) = \left\{ U_2(\omega_x) \text{ for } |\omega_x| \leq \frac{2\pi a_2}{\lambda f} \right.$$
$$\{0 \text{ otherwise}$$

Figure 4:
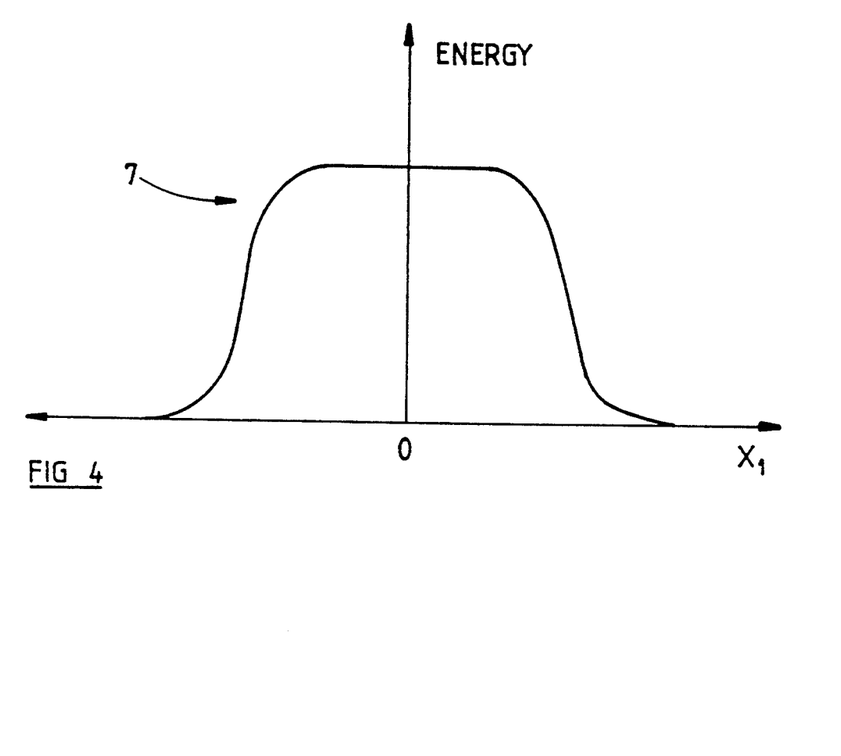
FIG. 4 shows a smoothed and homogenised intensity distribution of an excimer laser in a direction corresponding to $x_1$ of FIG. 3.

Qualitatively, such a filter as defined by $S(x_2)$ constitutes a low-pass spatial filter in the x dimension, only transmitting low spatial frequencies and eliminating high spatial frequencies. The peaks and ripples of an intensity distribution in the $x_1$ dimension such as 5 in FIG. 3 have primarily high spatial frequency components. Thus, spatial filtering through a filter $S(x_2)$ having a suitable gap width $2a_2$, of an image having an intensity distribution like 5 of FIG. 3, would substantially remove the high spatial frequency components, resulting in an output image intensity distribution in the $x_1$ dimension similar to 7 shown in FIG. 4.

Figure 10:
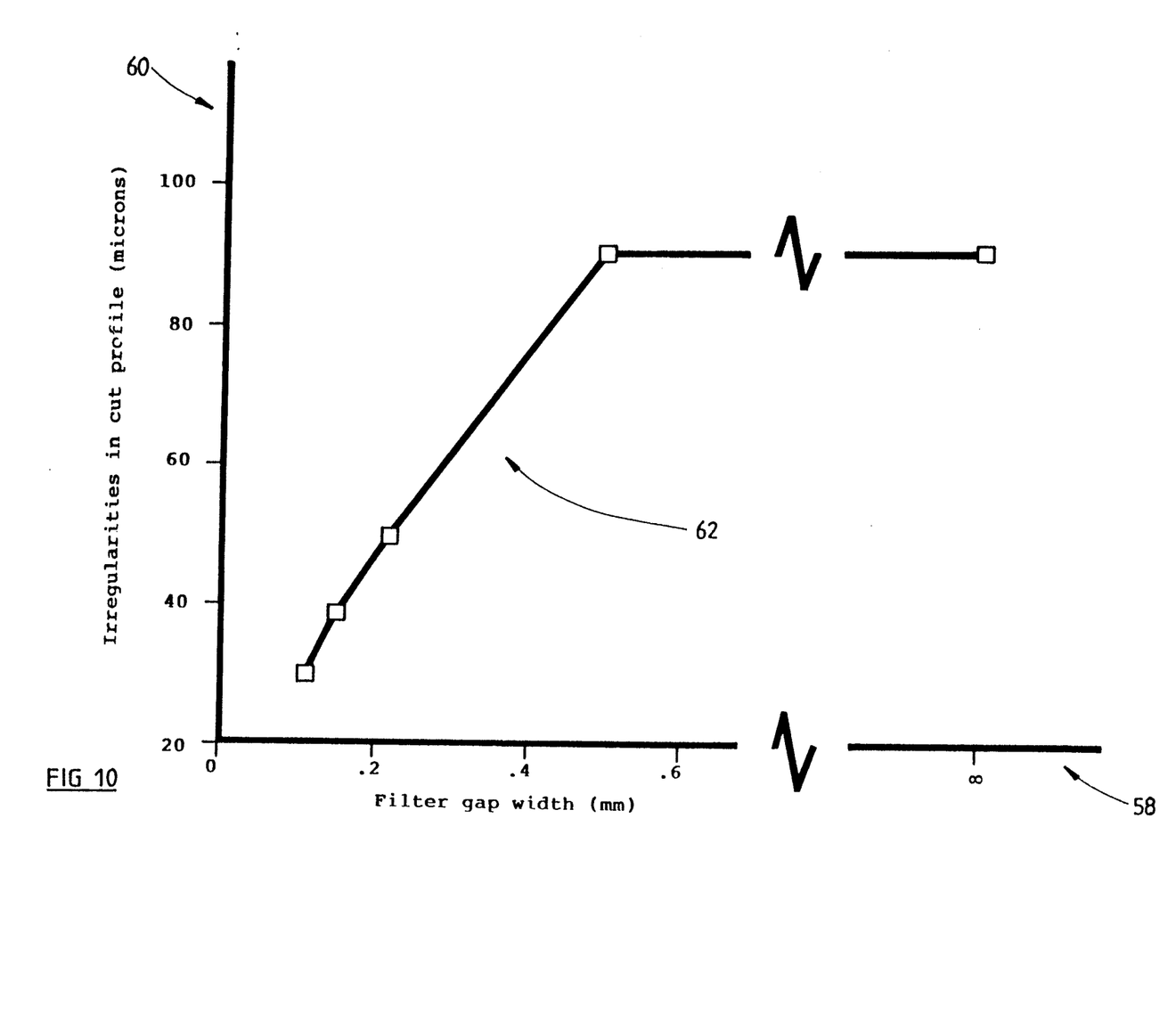
FIG. 10 is a graph showing experimental trial results obtained using a modification of the first embodiment of the present invention.

FIG. 10 shows the results of experimental trials using apparatus similar to the smoothing and homogenising apparatus 2, using an ultraviolet pulsed excimer laser producing 330 millijoules/pulse of 193 nm radiation as a collimated source. A 40×60 cm cylindrical lens having a 75 mm focal length was used as cylindrical focusing lens 8 to focus the laser output to a line. A narrow gap spatial filter was constructed from two pieces of stainless steel placed adjacent the focus line of the cylindrical lens, and accurately aligned to transmit the maximum amount of energy through the filter gap. A sheet of polymethylmethacrylate (PMMA) was placed 80 cm from the opposite side of the filter to the cylindrical lens, and was used as a test target for measurement of the beam characteristics. An equivalent to cylindrical expansion lens 22 of apparatus 2 was not utilised in the experimental trials.

The trials consisted of applying 6000 laser pulses at 10 Hertz to the PMMA surface via the cylindrical focusing lens and narrow gap spatial filter. The smoothness of the cut made in the PMMA was determined by measuring the difference in height between the highest and lowest deviations, within the field of view of a microscope (0.8 mm diameter), from a perfectly smooth profile. The microscope magnification was 250×, and the height of the peaks were measured using the focus adjustment on the microscope. The average of 11 such measurements were made at 1 mm step intervals over the cross section of the cut in the PMMA. The measurements of the smoothness of the cut profile in the PMMA were repeated for spatial filter gap widths of 0.11 mm, 0.15 mm, 0.22 mm, 0.50 mm, and with no spatial filter. The results of the trial measurements are shown in FIG. 10.

The measurement of irregularities in cut profile of the PMMA gives a measure of the smoothness and homogeneity of the intensity profile of the laser pulses. As is apparent from the graph in FIG. 10, the relative homogeneity of the intensity profile of the laser beam increased with decreasing gap widths. For gap widths below 0.1 mm the energy loss became substantial, and the task of aligning the gap with the focus line of the cylindrical lens became increasingly difficult. The energy loss for the gap width of 0.11 mm was only 20%, however, for this experimental trial the gap width that gave the most uniform and flattest intensity profile as 0.15 mm.

The embodiments of the present invention described hereinbefore can provide many advantages, particularly in relation to excimer lasers. The use of the narrow gap spatial filtering system according to the foregoing embodiments can provide the advantage that, when expanding an excimer laser beam, the energy contained in the high intensity peaks at the edges of the expanded beam (FIG. 3), which would normally have to be masked off, becomes distributed throughout the rest of the beam. By careful adjustment of the gap width and position a very uniform energy distribution can be obtained with little or no loss in energy density at the center of the beam.

Many modifications to the embodiments described herein are possible, the foregoing detailed description being put forward by way of illustration only. In particular, it is not necessary that the smoothing and homogenising apparatus of the embodiments utilise solely lenses or solely mirrors. A combination of one or more lenses and one or more mirrors for focusing and expansion of the laser beam is also envisaged. Indeed, as the experimental trial results have shown, the cylindrical mirror or lens 22, 32 of the described embodiments may not be required at all for some applications.

One modification relates to smoothing and homogenising energy variations that are perpendicular to the spatial filter gap. If a circularly symmetrical spatial filter system were employed, such as a pin hole at the focus point of a spherical lens, a difficulty arises with the use of high powered excimer laser radiation. The energy density of excimer laser when focused to a point is high enough to cause optical breakdown in air and to significantly ablate most materials. Consequently, a pin hole filter would not last much longer than a few laser pulses. The use of a narrow gap spatial filter as described hereinbefore, allows the energy to be distributed along a line instead of concentrated at a point. Optical breakdown is thus avoided and the material of the spatial filter does not have to withstand such high energy densities. Thus, to smooth energy variations perpendicular to the initial spatial filter gap, a modification of the apparatus envisages provision of a second cylindrical focusing lens and spatial filter gap perpendicular to the first. Such an apparatus can produce beams with a very smooth intensity distribution, however energy loss can become significant and the uniformity of the energy distribution could be reduced by the second spatial filter.

In many cases the laser intracavity optics can be adjusted to align all the major energy variations (for example, those caused by interference fringes) to be perpendicular to a single spatial filter gap. This allows maximum smoothing and still produces a uniform energy distribution, requiring only a relatively simple apparatus involving one spatial filter.

The narrow gap spatial filtering technique described herein may also be used in conjunction with the prior art smoothing methods and apparatus for a result that surpasses that which could be produced using any single technique alone.

Whilst a variety of embodiments have been disclosed, it will be readily apparent to those skilled in the art that numerous other modifications and variations not mentioned above are still possible without departing from the spirit and scope of the invention which is defined in the following claims.

I claim:

1. A method for homogenising a collimated input light beam having a non-uniform cross sectional intensity distribution, comprising the steps of:
    generating the input light beam via an excimer laser;
    focusing the beam into a line; and
    filtering the beam by means of a spatial filter disposed adjacent the line so as to produce an output beam, the spatial filter comprising a longitudinal gap defined between opposing edges of generally coplanar plate members constructed of a material with a high resistance to excimer laser oblation;
    whereby the output beam is homogenised such that the output beam has a relatively uniform cross sectional intensity distribution.

2. A method according to claim 1 wherein said input beam is focused into a line by means of a cylindrical lens.

3. A method according to claim 1 wherein said input beam is focused into a line by means of a concave cylindrical mirror.

4. A method according to claim 1, 2 or 3 wherein the plate members of the spatial filter comprise two separate plates which define said longitudinal gap between opposing edges thereof.

5. A method according to claim 4 wherein said plates are constructed of stainless steel.

6. A method according to claim 1, 2 or 3 wherein the spatial filter comprises a longitudinal slot formed in sheet material such that the plate members are integrally formed of said sheet material.

7. A method according to claim 6 wherein said sheet material is constructed of stainless steel.

8. A method according to claim 1, 2 or 3 including the step of collimating the output beam.

9. A method according to claim 8 wherein said, output beam is collimated by means of a cylindrical lens.

10. A method according to claim 8 wherein said output beam is collimated by means of a concave cylindrical mirror.

11. Apparatus for homogenising a collimated input light beam having a non-uniform cross-sectional intensity distribution, comprising:
    focusing means for focusing the input beam into a line; and
    a spatial filter disposed adjacent the line for filtering the beam to produce an output beam, the spatial filter comprising a longitudinal gap defined between opposing edges of generally coplanar plate members constructed of a material with a high resistance to excimer laser oblation;
    whereby the output beam is homogenised such that the output beam has a relatively uniform cross-sectional intensity distribution;
    wherein the input light beam is generated by an excimer laser.

12. Apparatus as claimed in claim 11 wherein said focusing means comprises a cylindrical lens.

13. Apparatus as claimed in claim 12 wherein said focusing means comprises a cylindrical lens having a predetermined focal length and having its longitudinal axis substantially orthogonal to the axis of the input beam, and a convex face oriented towards the source of the beam.

14. Apparatus as claimed in claim 11 wherein said focusing means comprises a concave cylindrical mirror.

15. Apparatus as claimed in claim 11, 12 or 14 wherein the plate members of the spatial filter comprise two separate plates which define said longitudinal gap between opposing edges thereof.

16. Apparatus as claimed in claim 15 including mounting means for removably mounting the spatial filter in its position adjacent the focus line.

17. Apparatus as claimed in claim 16 wherein the mounting means includes guide means which permits sliding removal and replacement of the spatial filter.

18. Apparatus as claimed in claim 16 wherein the mounting means includes position adjustment means which enables accurate adjustment of the spatial filter position.

19. Apparatus as claimed in claim 15 wherein said plates are constructed of stainless steel.

20. Apparatus as claimed in claim 11, 12 or 14 wherein said spatial filter comprises a longitudinal slot formed in sheet material such that the plate members are integrally formed of said sheet material.

21. Apparatus as claimed in claim 20 including mounting means for removably mounting the spatial filter in its position adjacent the focus line.

22. Apparatus as claimed in claim 21 wherein the mounting means includes guide means which permits sliding removal and replacement of the spatial filter.

23. Apparatus as claimed in claim 21 wherein the mounting means includes position adjustment means which enables accurate adjustment of the spatial filter position.

24. Apparatus as claimed in claim 20 wherein said sheet material is constructed of a material with a high resistance to excimer laser ablation.

25. Apparatus as claimed in claim 24 wherein said sheet material is constructed of stainless steel.

26. Apparatus as claimed in claim 11, 12 or 14 further comprising collimating means for collimating the homogenised output beam. .

27. Apparatus as claimed in claim 26 wherein said collimating means comprises a cylindrical lens.

28. Apparatus as claimed in claim 26 wherein said collimating means comprises a concave cylindrical minor.

29. Apparatus as claimed in claim 26 wherein said collimating means comprises a cylindrical lens arranged with its longitudinal axis substantially orthogonal to the axis of the input beam, and a convex face oriented away from the spatial filter.

30. A method for homogenising a collimated input light beam having a non-uniform cross-section intensity distribution defined by the function $U_1(x_1)$, where $x_1$ is a cross-sectional dimension of the input beam, comprising the steps of:

focusing the input beam to produce a transformed beam, the intensity distribution function $U_2(\omega_x)$ of which is defined by the Fourier transform of $U_1(x_1)$, such that $$U_2(\omega_x) = \int U_1(x_1) \exp[-i\omega_x x_1] dx_1;$$

filtering the transformed beam by means of a spatial filter having an aperture defined by the aperture function $S(x_2)$, where $$S(x_2) = \begin{cases} 1 \text{ for } -b \leq x_2 \leq b \\ 0 \text{ otherwise} \end{cases}$$

where $2b$ is the width of the aperture of said spatial filter and $x_2$ is a cross-sectional dimension of the transformed beam;

whereby to remove from the transformed beam spatial frequencies $\omega_x$ which are greater than a threshold $Kb$, where $K$ is a positive constant, and produce a filtered beam, the intensity distribution of which is defined by the function $U_3(\omega_x)$, where $$U_3(\omega_x) = \begin{cases} U_2(\omega_x) \text{ for } |\omega_x| \leq Kb \\ 0 \text{ otherwise,} \end{cases}$$

said filtered beam having substantially greater homogeneity of cross-sectional intensity distribution than said input beam.

31. A method as claimed in claim 30 including the step of collimating said filtered beam.

32. A method for homogenising a collimated input light beam having a non-uniform cross-sectional intensity distribution, comprising the steps of:

generating the input light beam via an excimer laser;
focusing the beam into a line; and,
filtering the beam by means of a spatial filter disposed adjacent the line so as to produce an output beam, the spatial filter comprising a longitudinal gap formed between portions of material having a high resistance to excimer laser ablation, the gap being aligned with said line and substantially uniform in the dimension orthogonal to the line and the focused beam along at least the majority of the line;
whereby the output beam is homogenised such that the output beam has a relatively uniform cross-sectional intensity distribution.

33. Apparatus for homogenising a collimated input light beam having a non-uniform cross-sectional intensity distribution, comprising:

focusing means for focusing the input beam into a line; and,
a spatial filter disposed adjacent the line for filtering the beam to produce an output beam, the spatial filter comprising a longitudinal gap formed between portions of material having a high resistance to excimer laser ablation, the gap being aligned with said line and substantially uniform in the dimension orthogonal to the line and the focused beam along at least the majority of the line;
whereby the output beam is homogenised such that the output beam has a relatively uniform cross-sectional intensity distribution;
wherein the input light beam is generated by an excimer laser.

* * * * *

UNITED STATES PATENT AND TRADEMARK OFFICE
CERTIFICATE OF CORRECTION

PATENT NO. : 5,331,466

DATED : July 19, 1994

INVENTOR(S) : Paul P. Van Saarloos

It is certified that error appears in the above-indentified patent and that said Letters Patent is hereby corrected as shown below:

Col. 5, line 14, delete "minor" and substitute therefor --mirror--.
Col. 5, line 15, delete "minor" and substitute therefor --mirror--.
Col. 5, line 16, delete "minor" and substitute therefor --mirror--.
Col. 5, line 17, delete "minor" and substitute therefor --mirror--.
Col. 6, line 64, after "a" insert --mounting--.
Col. 9, line 34, delete "2" and substitute therefor --s-- (2nd occurrence).
Col. 13, lines 5-6, Claim 28, delete "minor" and substitute therefor --mirror--.

Signed and Sealed this

Eighteenth Day of October, 1994

Attest:

BRUCE LEHMAN

*Attesting Officer*  *Commissioner of Patents and Trademarks*